(12) United States Patent  
Lai

(10) Patent No.: US 11,479,319 B2
(45) Date of Patent: Oct. 25, 2022

(54) ADJUSTABLE BOTTOM BRACKET MECHANISM

(71) Applicant: Sen-Piao Lai, Taichung (TW)

(72) Inventor: Sen-Piao Lai, Taichung (TW)

( * ) Notice: Subject to any disclaimer, the term of this patent is extended or adjusted under 35 U.S.C. 154(b) by 956 days.

(21) Appl. No.: 16/317,638

(22) PCT Filed: Jul. 14, 2016

(86) PCT No.: PCT/CN2016/089959
§ 371 (c)(1),
(2) Date: Jan. 14, 2019

(87) PCT Pub. No.: WO2018/010131
PCT Pub. Date: Jan. 18, 2018

(65) Prior Publication Data
US 2019/0291809 A1 Sep. 26, 2019

(51) Int. Cl.
*B62K 19/34* (2006.01)
*B62K 19/02* (2006.01)
*B62K 19/30* (2006.01)
(52) U.S. Cl.
CPC .............. *B62K 19/34* (2013.01); *B62K 19/02* (2013.01); *B62K 19/30* (2013.01)
(58) Field of Classification Search
CPC .................................................... B62K 19/34
See application file for complete search history.

(56) References Cited

U.S. PATENT DOCUMENTS

| 4,808,147 | A | * | 2/1989 | Graham ................ | B62K 19/34 384/431 |
| 5,496,114 | A | * | 3/1996 | Lin ....................... | B62M 3/003 384/515 |
| 6,895,834 | B1 | * | 5/2005 | Baatz .................... | B62M 3/02 280/259 |
| 7,854,440 | B2 | * | 12/2010 | Girout ................... | B62K 19/34 280/281.1 |
| 9,168,969 | B2 | | 10/2015 | Braun et al. | |
| 2009/0199677 | A1 | * | 8/2009 | Domahidy ............ | B62K 19/34 74/570.1 |

(Continued)

FOREIGN PATENT DOCUMENTS

| CN | 2233847 Y | 8/1996 |
| CN | 201040569 Y | 3/2008 |

(Continued)

*Primary Examiner* — Jacob D Knutson
(74) *Attorney, Agent, or Firm* — Muncy, Geissler, Olds & Lowe, P.C.

(57) ABSTRACT

An adjustable bottom bracket mechanism, comprising: a bottom bracket, an axial connection portion and a mounting portion. The bottom bracket includes at least one shaft through hole and is configured for connection of a seat tube. A lengthwise extension direction of the seat tube is defined as a first direction. The axial connection portion includes at least one axial through hole and axially corresponds to the at least one shaft through hole. The mounting portion is connected to the axial connection portion and adjustably fixedly connected to the bottom bracket in a first position or a second position. When the mounting portion is in either of the first and the second position, axes of the at least one shaft through hole and the at least one axial through hole are located on the first direction.

9 Claims, 9 Drawing Sheets

(56) References Cited

U.S. PATENT DOCUMENTS

2013/0165283 A1 * 6/2013 Braun .................. B62M 9/16
                                                                      74/571.1

FOREIGN PATENT DOCUMENTS

| CN | 202499242 | U | | 10/2012 |
|----|-----------|---|---|---------|
| CN | 103419876 | A | * | 12/2013 |
| CN | 103419876 | A | | 12/2013 |
| EP | 3025948 | A1 | | 6/2016 |
| GB | 690893 | A | * | 4/1953 |
| GB | 2451647 | A | | 2/2009 |

* cited by examiner

ADJUSTABLE BOTTOM BRACKET MECHANISM

BACKGROUND OF THE INVENTION

Field of the Invention

The present invention relates to a bottom bracket mechanism, especially an adjustable bottom bracket mechanism.

Description of the Prior Art

A conventional bottom bracket of bicycle has an axial through hole configured for insertional connection of a bottom bracket shaft. Bottom bracket shafts assembled to respective road and mountain bikes are located in different levels for comfortable and labor-saving riding in different environments.

The installation position of the bottom bracket shaft on the bottom bracket of a conventional bicycle is non-adjustable. As a result, bicycles with different levels of bottom bracket shafts are required to meet various requirements, which is noneconomic; and the bicycles take up so much space.

The present invention is, therefore, arisen to obviate or at least mitigate the above-mentioned disadvantages.

SUMMARY OF THE INVENTION

The main object of the present invention is to provide an adjustable bottom bracket mechanism which allows adjustment of a bottom bracket shaft on an extending direction of a seat tube of a bicycle.

To achieve the above and other objects, the present invention provides an adjustable bottom bracket mechanism, comprising: a bottom bracket, an axial connection portion and a mounting portion. The bottom bracket includes at least one shaft through hole and is configured for connection of a seat tube. A lengthwise extension direction of the seat tube is defined as a first direction. The axial connection portion includes at least one axial through hole and axially corresponds to the at least one shaft through hole. The at least one axial through hole and the at least one shaft through hole are configured for insertional connection of a bottom bracket shaft. The mounting portion is connected to the axial connection portion and adjustably fixedly connected to the bottom bracket in a first position or a second position. When the mounting portion is in either of the first position and the second position, axes of the at least one shaft through hole and the at least one axial through hole are located on the first direction. A position of the axis of the axial through hole, when the mounting portion is in the first position, is different from a position of the axis of the axial through hole, when the mounting portion is in the second position, on the first direction.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
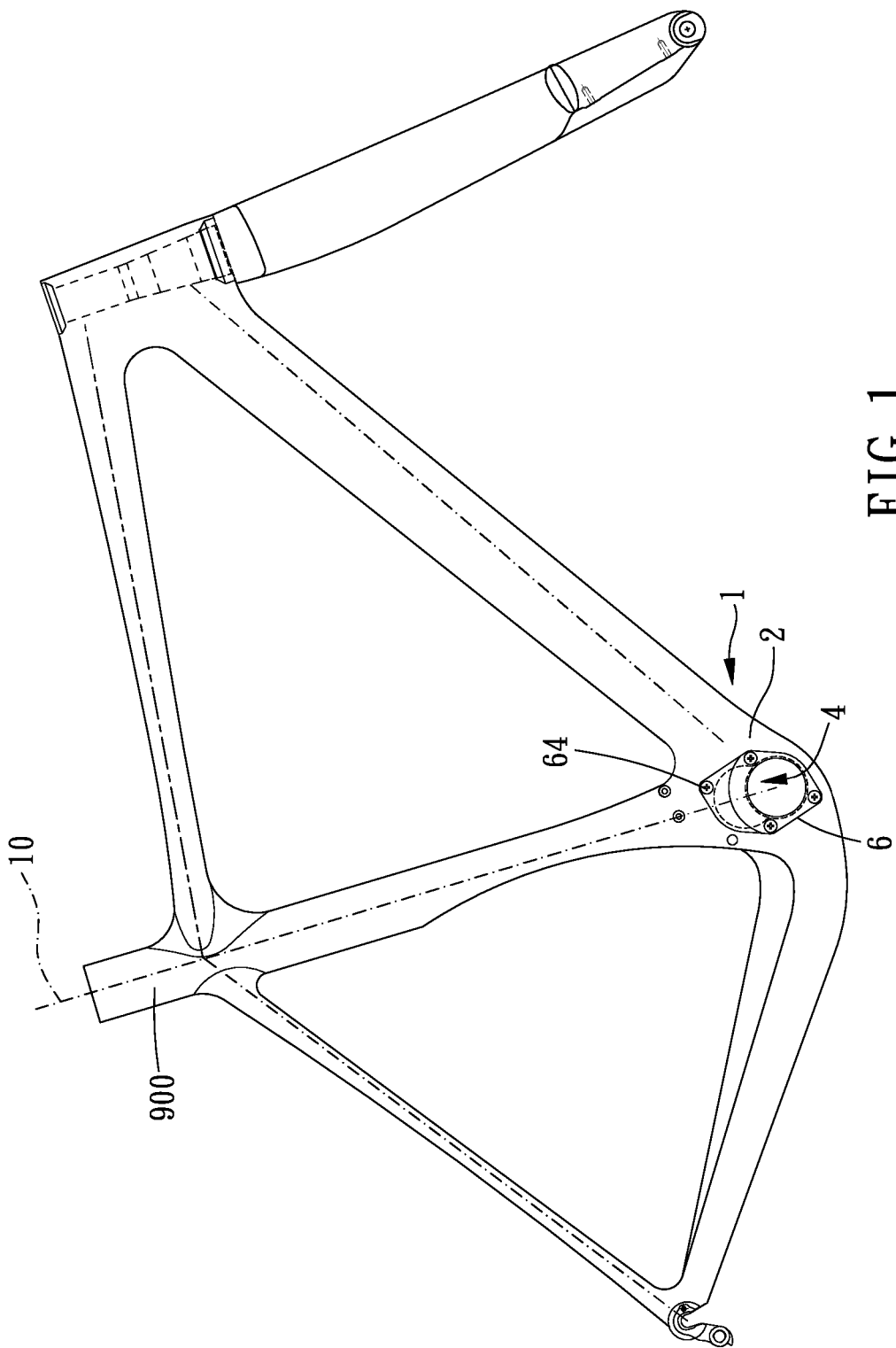
FIG. 1 is a side view of a first preferable embodiment of the present invention.
Figure 2:
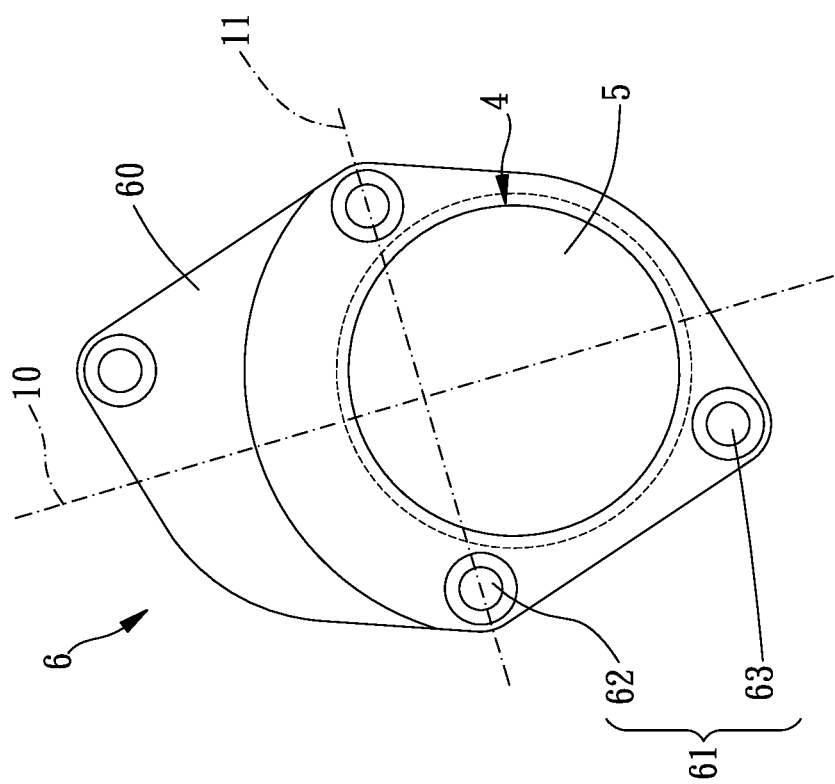
FIG. 2 is an enlargement of a mounting portion of the first preferable embodiment of the present invention.
Figure 3:
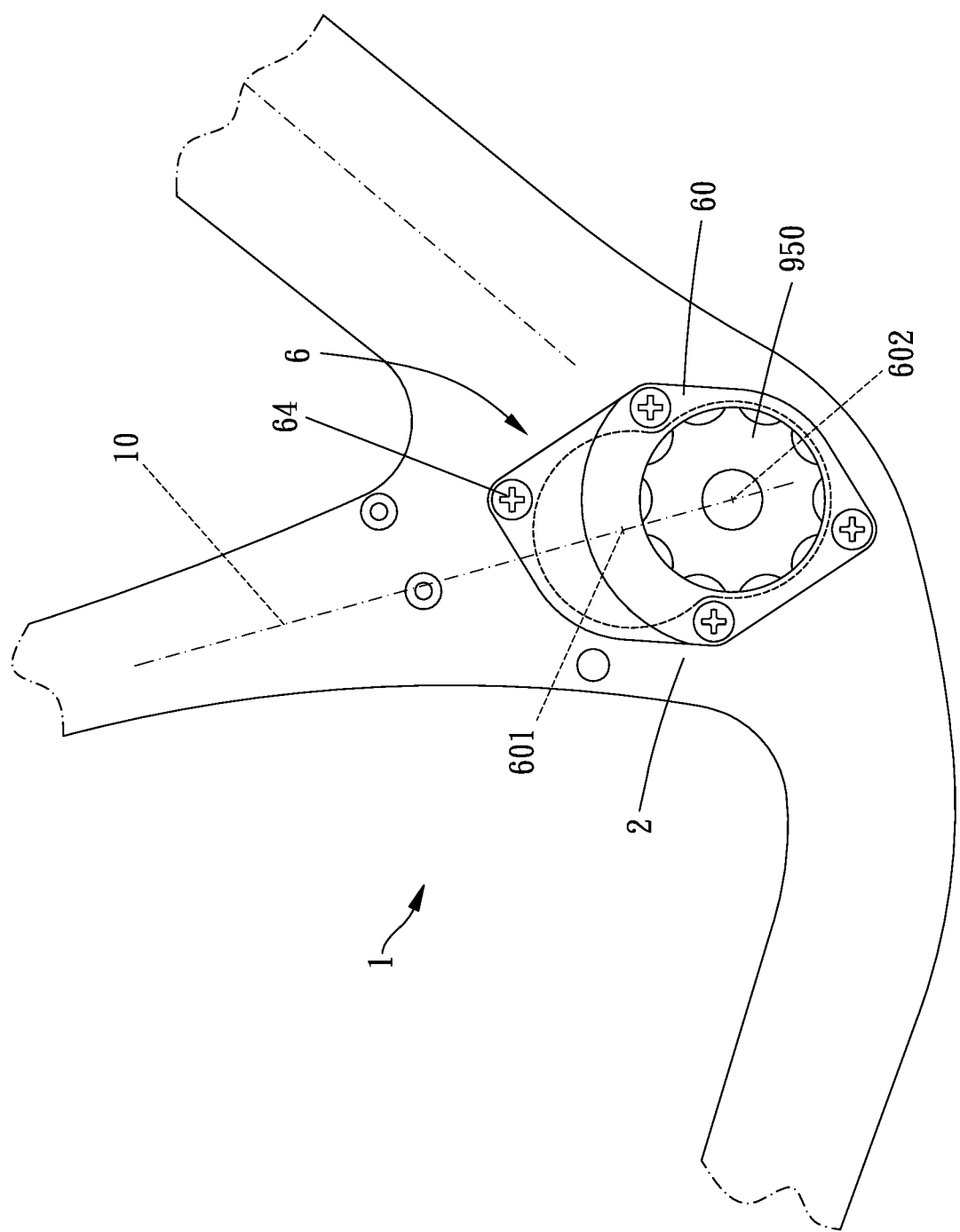
FIGS. 3 and 4 are schematic diagrams of the first preferable embodiment of the present invention in use.
Figure 4:
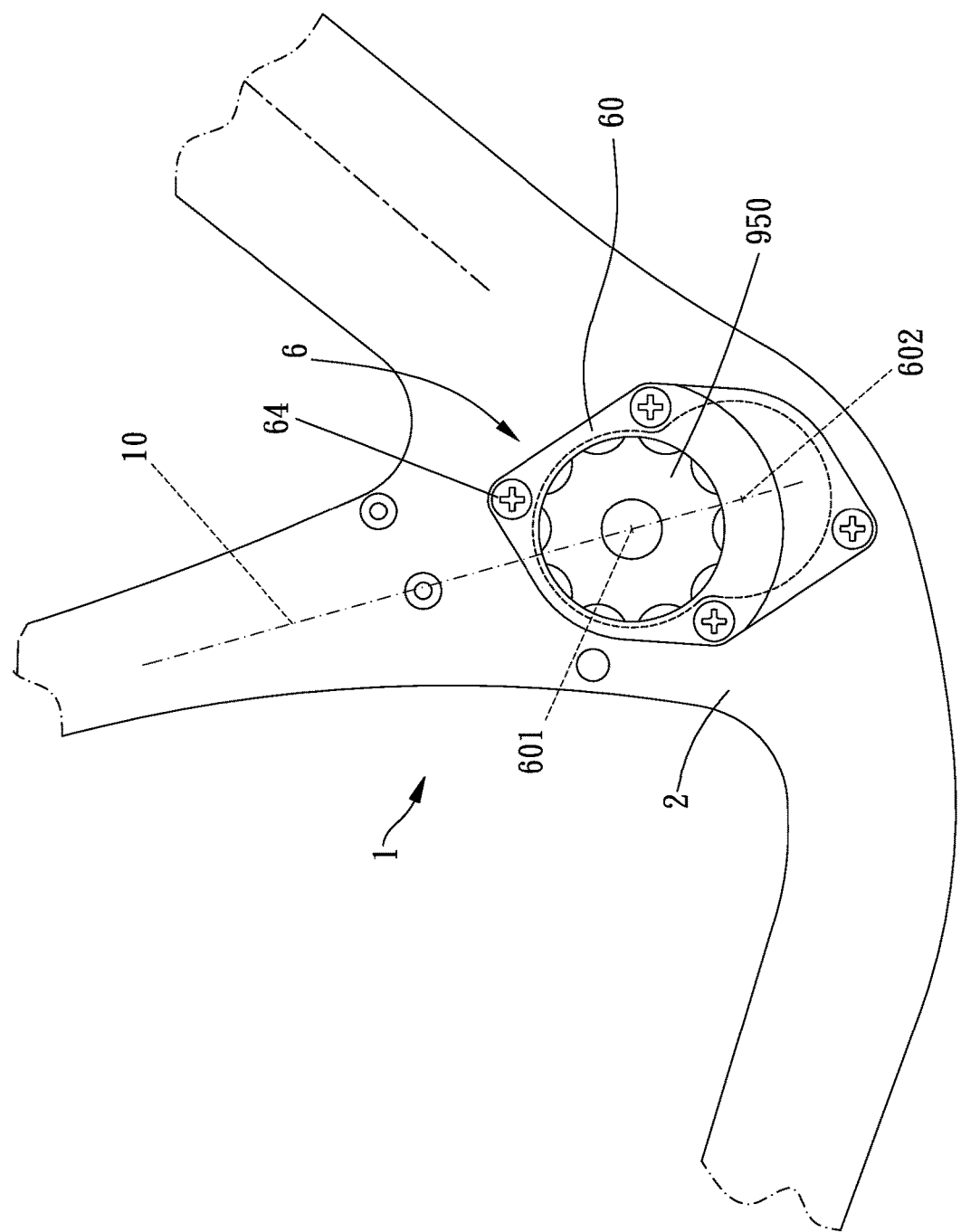

Please refer to FIGS. 1 to 7 for a first preferable embodiment of the present invention. An adjustable bottom bracket mechanism 1 of the present invention includes a bottom bracket 2, an axial connection portion 4 and a mounting portion 6.

The bottom bracket 2 includes at least one shaft through hole 3 and is configured for connection of a seat tube 900. A lengthwise extension direction of the seat tube 900 is defined as a first direction 10. The axial connection portion 4 includes at least one axial through hole 5 and axially corresponds to the at least one shaft through hole 3. The at least one axial through hole 5 and the at least one shaft through hole 3 are configured for insertional connection of a bottom bracket shaft 950. The mounting portion 6 is connected to the axial connection portion 4 and adjustably fixedly connected to the bottom bracket 2 in a first position or a second position. When the mounting portion 6 is in either of the first position and the second position, an axis of the at least one shaft through hole 3 and an axis of the at least one axial through hole 5 are located on the first direction 10. A position of the axis of the axial through hole 5, when the mounting portion 6 is in the first position, is different from a position of the axis of the axial through hole 5, when the mounting portion 6 is in the second position, on the first direction 10 (please refer to FIGS. 3 and 4, the axis 602 of the axial through hole 5 is located on the first direction 10 when the mounting portion 6 is located in the first position, the axis 601 of the axial through hole 5 is also located on the first direction 10 when the mounting portion 6 is located on the second position). Therefore, a position of the bottom bracket shaft 950 is adjustable on the first direction 10 so as to adjust a stepping center of gravity.

In this embodiment, the axial connection portion 4 is eccentrically connected to the mounting portion 6, and a position of the axial connection portion 4 is changeable on the first direction 10 by rotating the mounting portion 6. The axial connection portion 4 is a tubular member which is penetrated through the at least one shaft through hole 3, and the tubular member has the at least one axial through hole 5. The mounting portion 6 has a flange 60 radially protruding therefrom, and the flange 60 is located at an end of the tubular member and embedded within the bottom bracket 2. The flange 60 is detachably disposed on the bottom bracket 2 by a plurality of fasteners 64, and the flange 60 stably supports the axial connection portion 4. The bottom bracket 2 includes two of the shaft through holes 3, and axes of the two shaft through holes 3 are located on different positions on the first direction 10. The two shaft through holes 3 are communicated with each other with their minor arcs partially overlapped, and the bottom bracket 2 forms a blocking portion 30 between the two shaft through holes 3. The blocking portion 30 is abuttable to the axial connection portion 4, which prevents the axial connection portion 4 from free moving between the two shaft through holes 3.

The flange 60 has a plurality of through holes 61, and the plurality of through holes 61 include two first through holes 62 and two second through holes 63. The two first through holes 62 are located on a second direction 11 which is perpendicular to the first direction 10. The two second through holes 63 are disposed by two sides of the first direction 10 and two sides of the second direction 11. The plurality of fasteners 64 are inserted within at least part of the plurality of through holes 61 so as to position the flange 60 to the bottom bracket 2. Specifically, the first direction 10 is distanced from the two second through holes 63 equidistantly. The first and second directions 10, 11 define four quadrants, and the two second through holes 63 are diagonally located in two respective quadrants. A straight line passing through an origin is defined so that parts of the mounting portion 6 at opposite sides of the straight line have the same shapes.

A distance between one of the two second through holes 63 and the axis of the axial through hole 5 is different from a distance between the other of the two second through holes 63 and the axis of the axial through hole 5 so that the axial connection portion 4 can have a larger level difference after the mounting portion 6 is rotated 180 degrees. The bottom bracket shaft 950 is adjustable in a vertical height difference larger than or equal to 2.5 centimeters. The mounting portion 6 includes a first ring body 65 and a second ring body 66 which are coaxially connected with the axial connection portion 4, and a radial dimension of the second ring body 66 is larger than that of the first ring body 65. The second ring body 66 has a protruding ring 67 which protrudes away from the axial connection portion 4. In operation, a chainwheel of a bike is on the same side with the second ring body 66, and the protruding ring 67 of the second ring body 66 can keep in a certain distance between the chainwheel and a frame of the bike.

Figure 5:
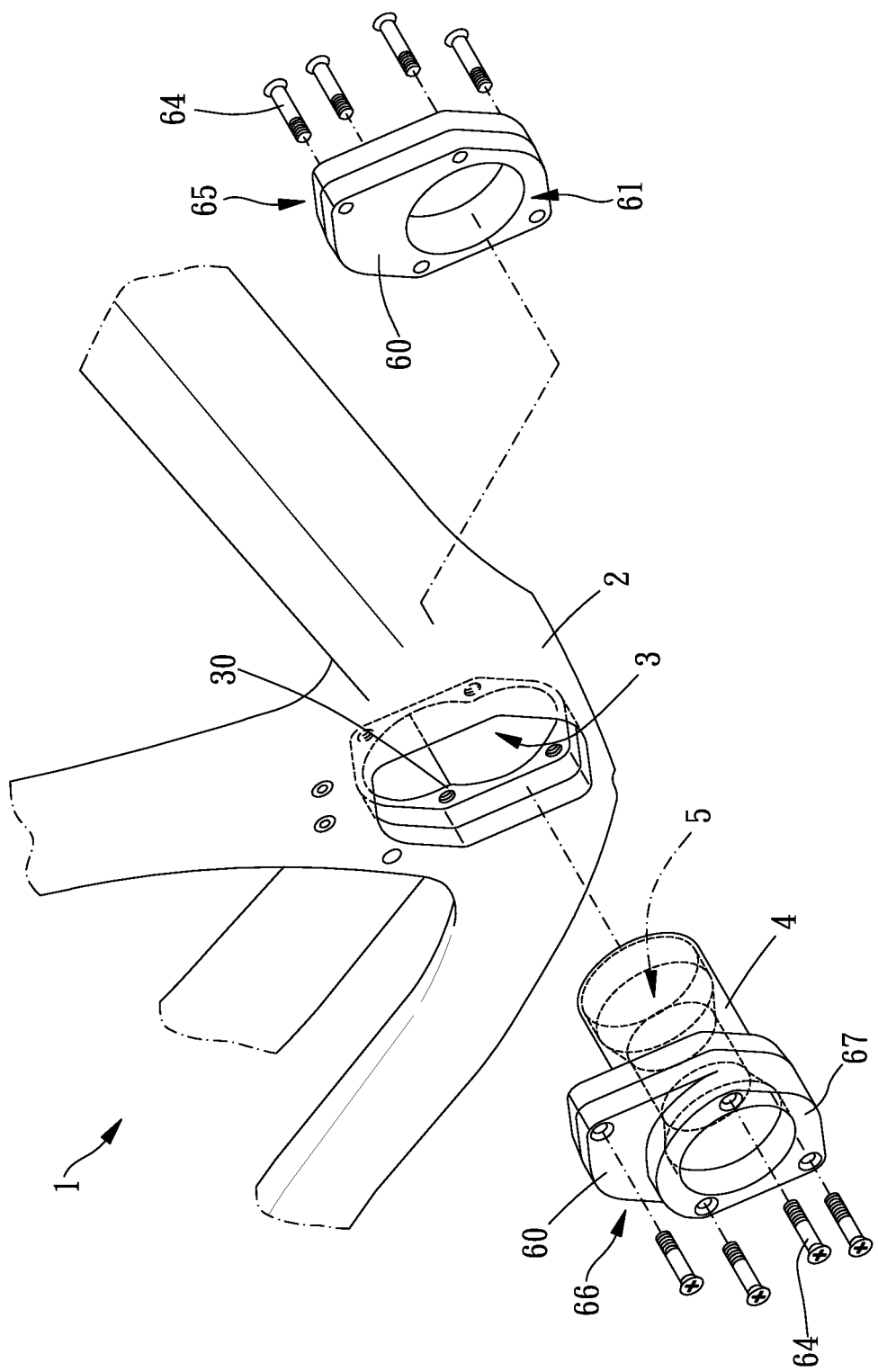
FIG. 5 is a breakdown drawing of the first preferable embodiment of the present invention.
Figure 6:
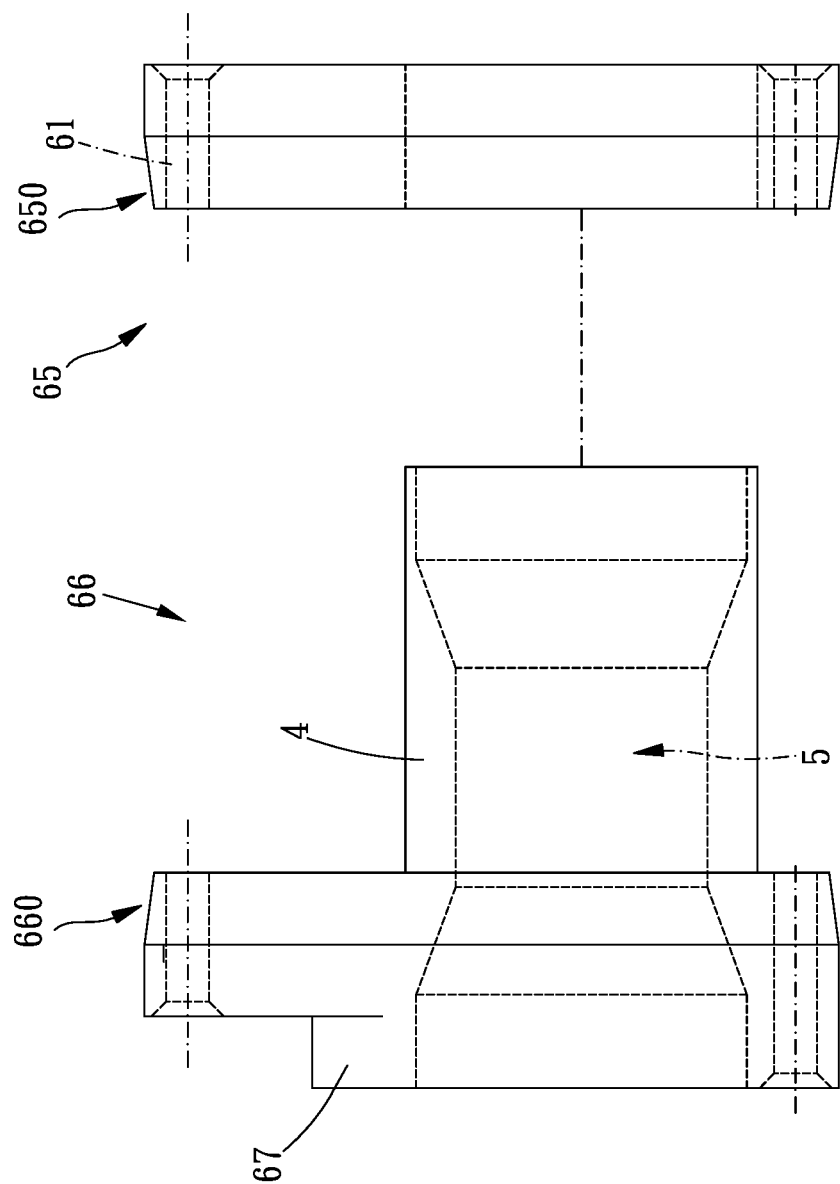
FIG. 6 is a partial breakdown drawing of the first preferable embodiment of the present invention.
Figure 7:
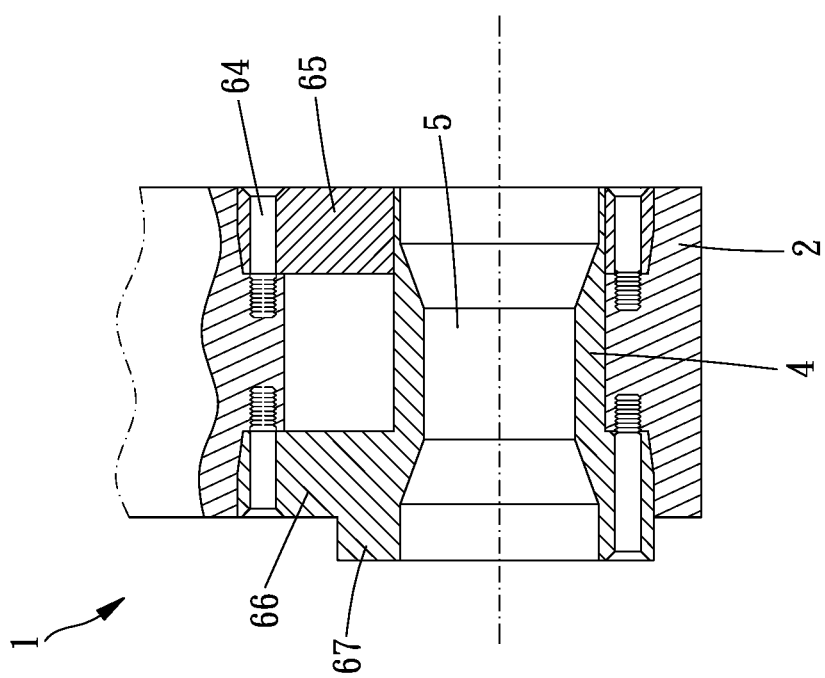
FIG. 7 is a cross-sectional view of the first preferable embodiment of the present invention.

The first ring body 65 is tapered in a direction from one-half of its circumferential wall toward the second ring body 66 and defines a first necking portion 650, the second ring body 66 is tapered in a direction from two-thirds of its circumferential wall toward the first ring body 65 and defines a second necking portion 660, and an inner wall of the bottom bracket 2 has a necking shape corresponding to outer contours of the first and second ring bodies 65, 66 (refer to FIGS. 5 to 7). Therefore, the first and second ring bodies 65, 66 can be stably positioned (when the first and second ring bodies 65, 66 are assembled to the bottom bracket 2, the first and second necking portions 650, 660 are helpful for positioning).

Figure 8:
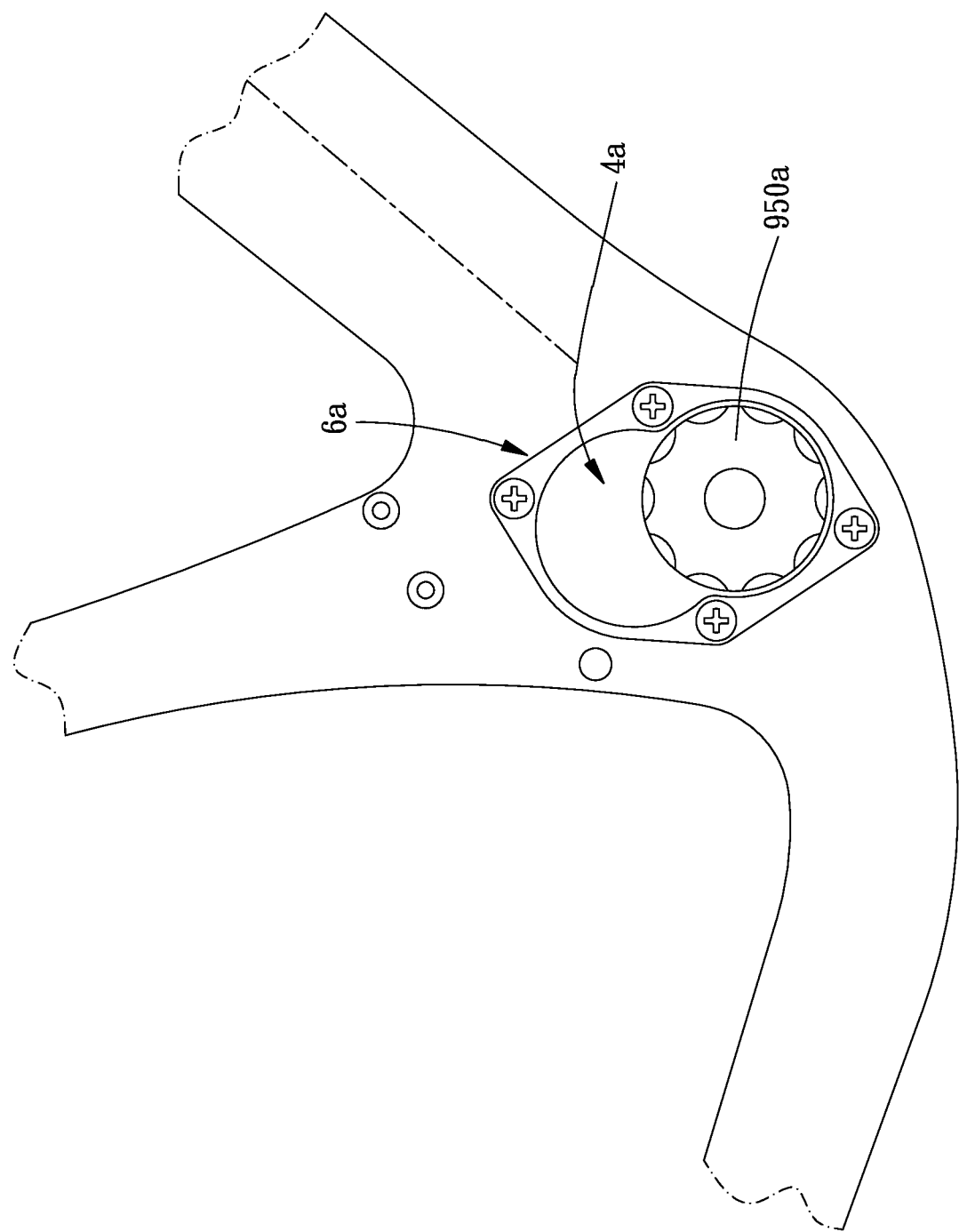
FIG. 8 is a side view of a second preferable embodiment of the present invention.

Please refer to FIG. 8 for a second embodiment, the mounting portion 6a may have a plurality of axial connection portions 4a so that the bottom bracket shaft 950a can be adjusted by being assembled to one of the plurality of axial connection portion 4a without detachment of the mounting portion 6a.

Figure 9:
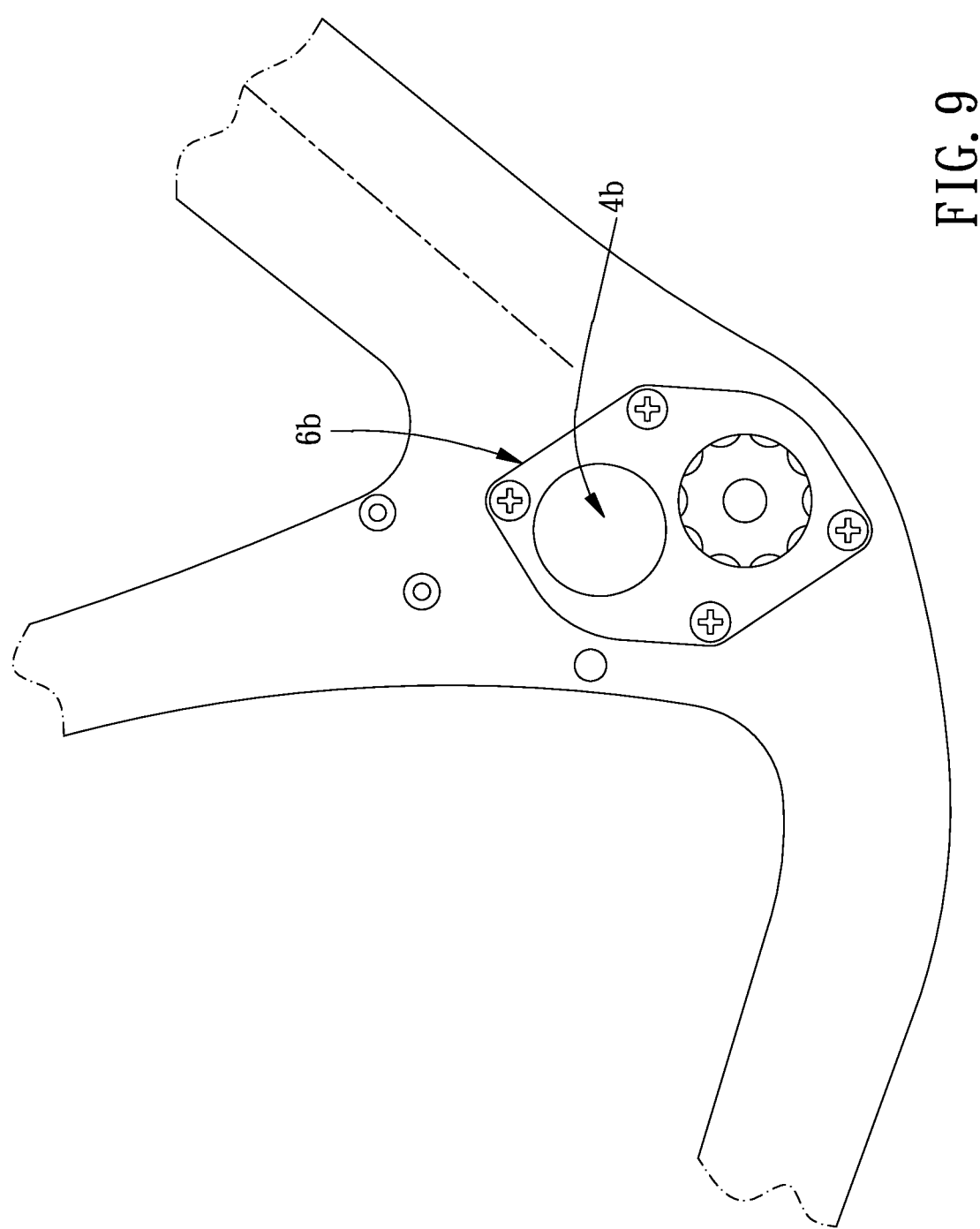
FIG. 9 is a side view of a third preferable embodiment of the present invention.

Please refer to FIG. 9 for a third embodiment, a plurality of axial connection portions 4b of the mounting portion 6b may be uncommunicated with one another.

In other embodiments, the flange of the mounting portion may be non-embedded within the bottom bracket, for example, and fixed on an outer wall of the bottom bracket. The bottom bracket may include other number of shaft through holes, and the shaft through holes may be selectively communicated with one another with their minor arcs partially overlapped. The axial connection portion may be non-eccentrically connected to the mounting portion. The axial connection portion may be the at least one axial through hole. The flange may be fixed on the bottom bracket by other way, for example, using tenon and mortise structures. A position of each of the through holes is not limited as long as the flange can be firmly positioned on the bottom bracket. The radial dimension of the first ring body may be equal to that of the second ring body. The first and second ring bodies may not have the first and second necking portions. Positions of the first and/or the second necking portion are not limited but helpful to position the first or/and second ring bodies. A rotational angle of the mounting portion is not limited as long as the axis of the axial through hole is located in the first direction. For example, the mounting portion may be rotated 180 degrees or 90 degrees and assembled to the bottom bracket.

In summary, the adjustable bottom bracket mechanism allows level adjustment of the stepping center of gravity to meet a rider's requirements, is convenient to use and has preferable structural strength and stability.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bottom bracket, including at least one shaft through hole and being configured for connection of a seat tube, a lengthwise extension direction of the seat tube being defined as a first direction;
   an axial connection portion, including at least one axial through hole and axially corresponding to the at least one shaft through hole, the at least one axial through hole and the at least one shaft through hole being configured for insertional connection of a bottom bracket shaft; a mounting portion, connected to the axial connection portion and adjustably fixedly connected to the bottom bracket in a first position or a second position;
   wherein when the mounting portion is in either of the first position and the second position, an axis of the at least one shaft through hole and an axis of the at least one axial through hole are located on the first direction; a position of the axis of the axial through hole, when the mounting portion is in the first position, is different from a position of the axis of the axial through hole, when the mounting portion is in the second position, on the first direction;
   wherein the axial connection portion is eccentrically connected to the mounting portion;
   wherein the axial connection portion is a tubular member which is penetrated through the at least one shaft through hole, the mounting portion has a flange radially protruding therefrom, and the flange is located at an end of the tubular member;
   wherein the flange is detachably disposed on the bottom bracket by a plurality of fasteners.

2. The adjustable bottom bracket mechanism of claim 1, wherein the tubular member has the at least one axial through hole.

3. The adjustable bottom bracket mechanism of claim 1, wherein the flange has a plurality of through holes, the plurality of through holes include two first through holes and two second through holes, the two first through holes are located on a second direction which is perpendicular to the first direction, the two second through holes are disposed by two sides of the first direction and by two sides of the second direction, and the plurality of fasteners are inserted within at least part of the plurality of through holes.

4. The adjustable bottom bracket mechanism of claim 3, wherein a distance between one of the two second through holes and the axis of the axial through hole is different from a distance between the other of the two second through holes and the axis of the axial through hole.

5. The adjustable bottom bracket mechanism of claim 4, wherein the tubular member has the at least one axial through hole; the bottom bracket includes two of the shaft through holes, axes of the two shaft through holes are located on different positions on the first direction; the two shaft through holes are communicated with each other with their minor arcs partially overlapped; the mounting portion includes a first ring body and a second ring body which are coaxially connected with the axial connection portion, and a radial dimension of the second ring body is larger than that of the first ring body; the second ring body has a protruding ring which protrudes away from the axial connection portion; the first ring body is tapered in a direction from one-half of a circumferential wall of the first ring body toward the second ring body, the second ring body is tapered in a direction from two-thirds of a circumferential wall of the second ring body toward the first ring body, and an inner wall of the bottom bracket has a necking shape corresponding to outer contours of the first and second ring bodies.

6. The adjustable bottom bracket mechanism of claim 1, wherein the bottom bracket includes two of the shaft through holes, axes of the two shaft through holes are located on different positions on the first direction.

7. The adjustable bottom bracket mechanism of claim 6, wherein the two shaft through holes are communicated with each other with their minor arcs partially overlapped.

8. The adjustable bottom bracket mechanism of claim 1, wherein the mounting portion includes a first ring body and a second ring body which are coaxially connected with the axial connection portion, and a radial dimension of the second ring body is larger than that of the first ring body.

9. The adjustable bottom bracket mechanism of claim 1, wherein the bottom bracket shaft is adjustable in a vertical height difference larger than or equal to 2.5 centimeters.

* * * * *